Nov. 7, 1933.　　　　　O. W. AMES　　　　　1,933,953
MEANS FOR MAKING COMPOSITE PHOTOGRAPHS
Filed Aug. 16, 1932　　　2 Sheets-Sheet 1

INVENTOR.
Oliver W. Ames
BY
ATTORNEYS.

Nov. 7, 1933.         O. W. AMES         1,933,953
MEANS FOR MAKING COMPOSITE PHOTOGRAPHS
Filed Aug. 16, 1932         2 Sheets-Sheet 2

INVENTOR.
Oliver W. Ames
BY
ATTORNEYS.

Patented Nov. 7, 1933

1,933,953

UNITED STATES PATENT OFFICE 1,933,953

MEANS FOR MAKING COMPOSITE PHOTOGRAPHS

Oliver W. Ames, La Verne, Calif.

Application August 16, 1932. Serial No. 629,017

8 Claims. (Cl. 95—36)

This invention relates in general to composite photography, and more particularly to a means of making composite still photographs on sensitized positive paper as distinguished from films, plates, etc., whereby a suitable design forming a background for the picture of a subject is first photographed on the sensitized positive paper with a certain area of the picture unexposed to the light, and thereafter the photograph of a subject is made on the previously unexposed area within the design.

It is an object of this invention to provide a simple, economical and effective photographic unit of portable character and embodying therein all of the elements, accessories and apparatus necessary to complete a photographic operation so that photographs may be taken of subjects and delivered in rapid order from the unit when and as made.

Devices of this character are especially adaptable to beach resorts and public gatherings, and in lieu of certain types of automatic coin operated cameras my photographic unit is of such size and character that an operator or attendant may work within the cabinet which serves to house the unit for developing the photographs made.

In order to eliminate all unnecessary operations I prefer to use a well known type of sensitized paper instead of film or photographic plates so that successive photographs may be made on adjacent sections of the paper and said sections may be cut from the strip and developed when and as made for delivery to the purchaser.

My invention contemplates the production of composite photographs in any suitable manner which will meet the requirements of ordinary commercial photography and may be practiced in any of three different methods, viz: direct photography, projection, or by direct contact printing.

In the accompanying drawings I have shown a preferred form of apparatus for attaining the objects of my invention, with certain modifications necessary or desirable for converting the apparatus for use in practicing any one of the methods mentioned. In said drawings, Fig. 1 is a sectional elevation of a complete photographic unit embodying my improvements and arranged for making direct photographs by means of a camera from a subjective image or design forming a background for a picture and for making simultaneously therewith a photograph of a person so as to produce a composite photograph of the design and the person.

Figure 1:
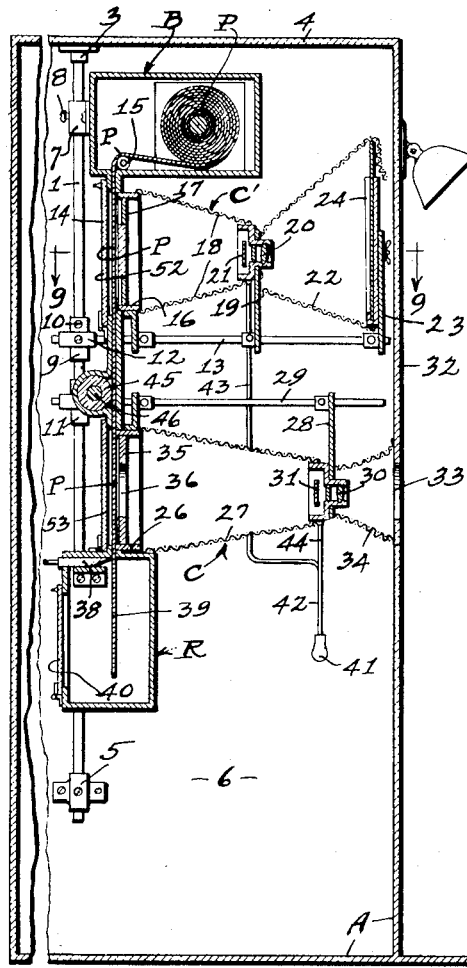

The apparatus is generally arranged as shown in Fig. 1 and includes a lightproof cabinet A within which all of the mechanism is suitably mounted and ample space is provided, preferably for an operator or attendant to work, as in a dark room, for operating the mechanism and for developing and dispensing the pictures made.

In the direct photographic method the apparatus includes a lightproof box B for operatively supporting a roll of sensitized photographic paper P. A camera C for photographing a subject when positioned exteriorly of the cabinet and a second camera C' preferably arranged above the camera C for photographing a suitable design forming a background for pictures made of the subject by means of a camera C. Below the camera C a suitable lightproof receptacle R is provided for receiving the exposed sections of the paper P prior to the development thereof for producing the photographs.

It is desirable that all of the mechanism within the cabinet A be arranged as a detachable unit with each of the several elements adjustable in position relative to the other elements. To this end I may provide a pair of vertical rods 1 and 2 which are held at their upper ends in fittings, as at 3, attached to the top 4 of the cabinet and at their lower ends in brackets 5 attached to the sides, as at 6, 6, of the cabinet or otherwise.

The box B which holds the undeveloped paper is adjustably held on the rods 1 and 2 by means of slides 7 held in position by means of set screws 8. In a similar manner camera C' is adjustably supported on the rods 1 and 2 by means of slides 9 secured by set screws 10, and camera C is supported by means of slides 11 held by similar set screws. The slides 9 of camera C' have horizontal bosses 12, 12 which support a pair of horizontal rods 13, 13 on which the camera C' is horizontally adjustable as in ordinary cameras.

The box B and receptacle R are connected by means of a lightproof tube 14 of rectangular cross section within which the paper P is moved downwardly over a roller 15 in the bottom of box B thru said tube adjacent the cameras C' and C and into the receptacle R without exposure to light except in the cameras C' and C during successive photographic operations.

Figure 2:
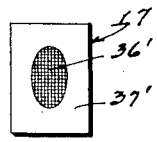
Fig. 2 is a face view of a glass vignette employed preferably adjacent the sensitized paper in the camera and having certain transparent and opaque areas thereon.
Figure 9:
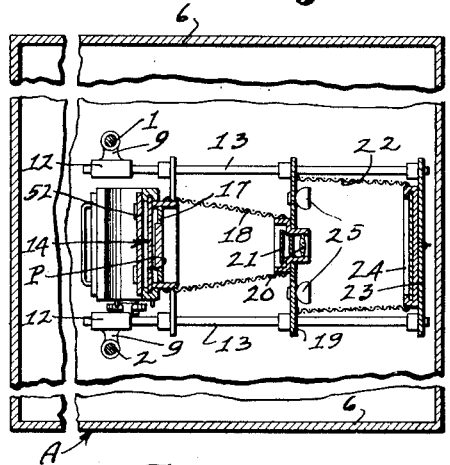
Fig. 9 is a sectional plan of the apparatus on line 9—9 of Fig. 1.

Camera C' has a box 16 at its rear end which serves to operatively support a glass plate 17 adjacent the paper P and of the character shown in Fig. 2. A bellows 18 connects the box 16 with a lens mounting 19 whereby a lens 20 and a shutter and diaphragm 21 are operatively mounted in the camera. Another bellows 22 connects the lens mounting 19 with a subjective holder 23 whereby a card or plate 24 on which a suitable design is formed for providing a background for the pictures is adjustably supported relative to the lens. As shown in Fig. 9, one or more lights 25 may be provided within the bellows 22 for directing light against the subjective card or plate 24 during a photographic operation.

The front side of tube 14 is open at the rear of camera C' adjacent the vignette or plate 17 so that when the shutter and diaphragm 21 are open the design on the subjective card 24 will be reproduced on the sensitized forward surface of the paper strip P.

It will be noted that the portions 16, 19 and 23 of the camera are individually adjustable on the rods 13, 13 for properly focusing the lens on the subjective design whereby faithful reproductions of the design may be made on the paper P.

Camera C has a box 26 adjacent the front side of tube 14 which is connected by means of a bellows 27 with a lens mounting 28 adjustably supported on a pair of rods 29 which are fixedly held in the slides 11. The mounting 28 supports a lens 30 and a shutter and diaphragm mechanism 31. The front wall 32 of the cabinet has an opening 33 axially alined with the lens 30 and a bellows 34 preferably connects the lens mounting 28 with the wall 32 so as to exclude the light which enters the opening 33 from the interior of the cabinet.

Figure 3:
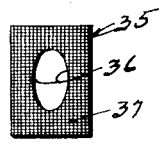
Fig. 3 is a face view of a plate preferably corresponding in size to the vignette shown in Fig. 2 and formed of wood, with an opaque area corresponding to the transparent area of the vignette and having a central opening corresponding in size to the opaque area of the vignette.

The lens mounting 28 and the box 26 of camera C are adjustable on the rods 29 for effecting the proper focusing of the camera. As in the case of camera C' the front side of tube 14 is open adjacent the rear side of box 26 and a plate or vignette 35 is operatively supported in a box 26 adjacent the paper P. The vignette 35 is shown in Fig. 3 and may consist of an opaque block of wood or other material with a central opening 36 therein corresponding in size and form to the portion 36' of the vignette 17, while the opaque portion 37 of the vignette 35 corresponds to the transparent portion 37' of the plate 17.

Adjacent, upon or within the receptacle R a suitable knife 38 may be provided for cutting the exposed section, as at 39, from the photographic paper P. Said knife may be operated in any suitable manner and is not material to my invention. Thus when the photographs are cut from the paper P they will be deposited in the receptacle R and may be withdrawn by the operator thru a door 40 on the rear side of the receptacle.

The shutters 21 and 31 of cameras C' and C respectively may be operated by any suitable means, but I have shown the usual air bulb 41 connected by means of a tube 42 and branches 43 and 44 resectively with said shutters.

At any suitable point intermediate the box B and receptacle R I may provide a friction roller 45 fixed to a shaft 46 and frictionally engaging the paper P within the tube 14 so as to move the strip downwardly thru said tube for positioning successive portions thereof relative to the cameras C and C'. One end of the shaft 46 may be provided with a ratchet 47 (see Fig. 6) and an operating handle 48 which carries a spring held pawl 49 operatively engaging said ratchet. The paper P is advanced at each photographic operation for a distance sufficient to move an unexposed portion of the paper into photographing position relative to camera C'.

Figure 6:
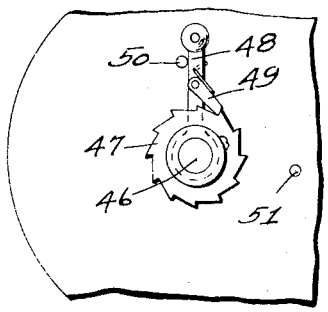
Fig. 6 is an exterior view of the cabinet showing means for moving the sensitized paper to and from photographing position relative to the cameras.

This operation is accomplished by moving handle 48 to the right as seen in Fig. 6 from a position of rest against a stop 50 and until said handle engages a second stop 51 whereupon the handle may be retracted without correspondingly rotating the shaft 46 until the handle re-engages the stop 50. Thus the handle is reset for another photographic operation.

The tube 14 is preferably provided on its rear side with doors 52 and 53 for affording access to the camera or the paper P for any purpose.

Figure 4:
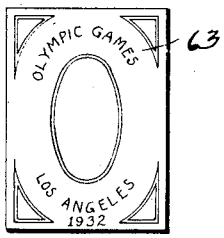
Fig. 4 is a view of a completed photograph of the subjective image forming the design for the background.

In carrying out a photographic operation by means of the mechanism shown in Fig. 1, the box B is provided with the roll of paper P and said paper is threaded thru the tube 14 so that the lower end thereof extends slightly into the receptacle R. A suitable background design as of the character shown in Fig. 4 is formed on the subjective card 24, and said card is adjusted on its holder 23 and the holder 23 on the supporting rods 13, and lens 20 is adjusted also on said rods into focus with the subjective. The vignette 17 is then properly positioned on the box 16 of camera C' and said camera is then operatively adjusted for producing successive photographs of the design on the unexposed portion of paper P adjacent the vignette 17 from which light is excluded by shutter 21.

Figure 5:
Fig. 5 is a view of the completed composite photograph embodying the design of Fig. 4 and also the image of a subject.

In order to place the apparatus in condition for making a composite photograph of the character shown in Fig. 5 it is necessary to first expose a sufficient number of adjacent portions of the paper P for producing a succession of images of the design on card 24 so that the first of said exposed portions will be operatively positioned adjacent the vignette 35 of camera C when the first photograph of a person is to be made.

These preliminary photographic operations are accomplished successively by operating the shutter 21 thru the medium of bulb 41 and by advancing the paper P a distance corresponding to the length of one section at the completion of each exposure.

Thereafter when a subject, as at S, is positioned in front of the opening 33 and camera C is adjusted into focus with the subject the operation of the bulb 41 by the attendant will simultaneously expose the portion of paper P adjacent vignette 17 for forming thereon the image of the subjective 24 and expose the previously unexposed section of the paper adjacent vignette 35 so as to form thereon the image of the subject S.

It may be noted at this point that the distance between the cameras C and C' may be varied as may be desired, but I have shown the cameras so positioned relative to each other that the distance therebetween corresponds to the length of one section or frame on the paper P.

Figure 10:
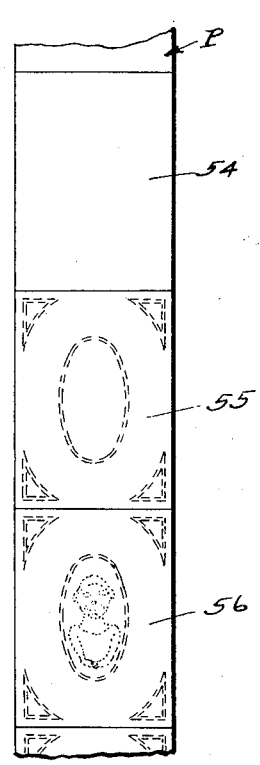
Fig. 10 is a fragmentary view of the sensitized photographic paper showing a section thereof unexposed, an adjacent section with the image of the background design thereon, and another section with the composite photograph of the design and subject.

For instance, in Fig. 10, the section 54 adjacent the vignette 17 is unexposed, the sections 55 and 56 have been partially exposed so as to form thereon the design shown in Fig. 4, and at the completion of an operation the section 56 has thus been twice exposed so as to provide a composite photograph including the design of the subjective 24 and the image of the subject S.

Figure 7:
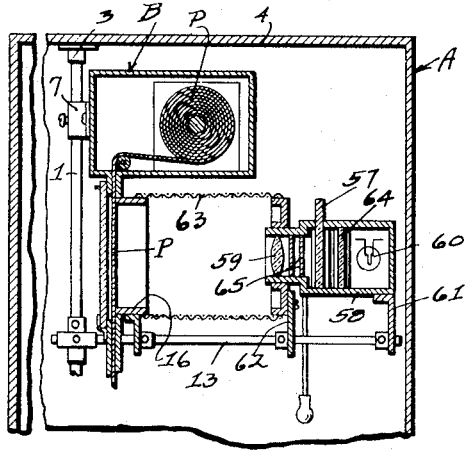
Fig. 7 is a fragmentary view corresponding to Fig. 1, but showing a modified form of apparatus arranged to produce images on the sensitized paper by projection.

A modified method of making composite photographs is shown in Fig. 7 and includes means for projecting the subjective matter from a glass negative 57 onto the unexposed portion of paper P adjacent the box 16. In the practice of this method I provide a projector case 58 for removably supporting the negative 57 between a lens 59 and a lamp 60. The case 58 is adjustably mounted on the rods 13 by means of one or more supports, as at 61 and 62, and a lightproof bellows 63 connects the box 16 with the lens mounting. The negative 57 corresponds to the vignette 17 shown in Fig. 2 except that the design 63 forming the background is formed thereon exteriorly of the opaque central portion as at 36'.

Intermediate the negative 57 and lamp 60 I provide a translucent plate 64 for the purpose of diffusing the light directly thru the negative and intermediate the plate 57 and lens 59 I provide a shutter and diaphragm mechanism as at 65. The operation of this type of apparatus is otherwise the same as in the direct photographic method illustrated in Fig. 1 except that the vignette 17 is omitted and the design 63 is formed on a reduced scale on the negative 57 and is enlarged by means of lens 59 and projected onto the unexposed section 54 of paper P.

Figure 8:
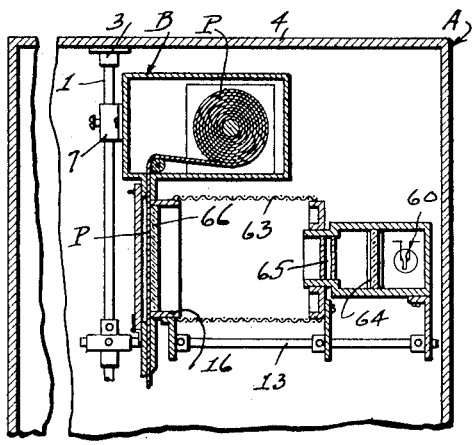
Fig. 8 is a similar view of the apparatus when arranged to produce images on the sensitized paper by direct contact printing.

As shown in Fig. 8, substantially similar results may be accomplished by the employment of a direct contact printing method wherein the lens 59 and the negative 57 are omitted and in lieu thereof a negative 66 is supported in the box 16 in close contact with the unexposed section 54 of paper P so that when the shutter 65 is opened light from the lamp 60 will be directed against the negative 66, and said negative will have formed thereon the design 63 and an opaque portion corresponding to the portion 36' of vignette 17 so that the central portion of the section 54 will be unexposed until said section is positioned adjacent to and the camera C is operated for producing an image of the subject S.

It will be understood in the consideration of my invention that I have provided a unitary structure embodying separate spaced means for simultaneously producing an image of a border design and an image of a subjective on corresponding portions of a strip of sensitized material, together with means for controlling and diffusing the light projected upon the light sensitive material so that the same degree of exposure is effected in both instances. In this connection it must be emphasized that in order to produce a satisfactory composite photograph embodying a border design common to all exposures and a photograph of a live subject within or adjacent the border it is absolutely necessary to so arrange and operate the mechanism that the two exposures will be for exactly the same period of time. In order to control the light, I have, as hereinbefore stated, found it necessary to employ a shutter or iris between the light and the light sensitive material, and preferably in addition to the shutter a ground glass or other glass of translucent character for the purpose of breaking up and diffusing the light directed to the light sensitive material. Accordingly, I am enabled to produce by means of my mechanism, either by photographic projection or contact methods, photographs which are clear cut, sharp in outline and uniform in finish.

What I claim is:

1. An apparatus for producing composite photographs comprising an image reproducing device including a light for exposing corresponding areas on successive portions of a strip of light sensitive material for reproducing a border design, a camera spaced therefrom for exposing corresponding areas of said portions of light sensitive material to light directed upon a subject, means for moving a strip of light sensitive material into and from position for exposure before said image reproducing device and said camera, and means embodied in said image reproducing device intermediate said light and said strip of material for diffusing and controlling the light, for the purpose described.

2. An apparatus for producing composite photographs comprising an image reproducing device including a light for exposing corresponding areas on successive portions of a strip of light sensitive material for reproducing a border design, a camera spaced therefrom for exposing corresponding areas of said portions of light sensitive material to light directed upon a subject, means for moving a strip of light sensitive material into and from position for exposure before said image reproducing device and said camera, means embodied in said image reproducing device intermediate said light and said strip of material for diffusing and controlling the light, said last mentioned means including a shutter, said camera including a shutter, and means for simultaneously operating said shutters whereby the exposures of different portions of said light sensitive material to different subjectives are simultaneous and of like duration, for the purpose described.

3. An apparatus for producing composite photographs comprising a cabinet, means therein for movably supporting a strip of light sensitive material, means adjacent said strip of material for exposing corresponding areas of successive portions of the strip of material to light for producing a border design, means spaced therefrom and adjacent said strip of material for exposing other areas of said successive portions of material for producing an image of a subjective within said border design, and means intermediate the source of light and the strip of light sensitive material for diffusing and controlling the light directed to the exposed portions of said material whereby the separate exposure of the different areas of each portion of said strip of material may be uniform.

4. An apparatus for producing composite photographs comprising a cabinet, means therein for movably supporting a strip of light sensitive material, means adjacent said strip of material for exposing corresponding areas of successive portions of the strip of material to light for producing a border design, means spaced therefrom and adjacent said strip of material for exposing other areas of said successive portions of material for producing an image of a subjective within said border design, means intermediate the source of light and the strip of light sensitive material for diffusing and controlling the light directed to the exposed portions of said material whereby the separate exposure of the different areas of each portion of said strip of material may be uniform, said last mentioned means including shutters for controlling the separate exposures, and means for simultaneously and correspondingly operating said shutters.

5. An apparatus for producing composite photographs comprising a primary exposure device including a source of light, a shutter, and means for supporting a background design to be reproduced, a camera spaced from said primary device including a shutter and a source of light for reproducing an image of a subjective, means for moving a strip of light sensitive material into and from positions for registering successive portions thereof with said primary exposure device and with said camera, means included in said primary device for blocking out certain areas of successive portions of said light sensitive material not to be exposed to said background design, means included in said camera for blocking out the areas covered by said background design, and means for operating said shutters so as to provide uniform exposures of the different areas on different portions of said material in a single operation.

6. An apparatus for producing composite photographs comprising a primary exposure device including a source of light, a shutter, and means for supporting a background design to be reproduced, a camera spaced from said primary device including a shutter and a source of light for reproducing an image of a subjective, means for moving a strip of light sensitive material into and from positions for registering successive portions thereof with said primary exposure device and with said camera, means included in said primary device for blocking out certain areas of successive portions of said light sensitive material not to be exposed to said background design, means included in said camera for blocking out the areas covered by said background design, means for operating said shutters so as to provide uniform exposures of the different areas on different portions of said material in a single operation, and a cabinet for supporting and enclosing said primary exposure device and said camera as a unit.

7. An apparatus for producing composite photographs comprising spaced means for producing an image of a background design and an image of a different subjective on different areas of successive portions of a strip of light sensitive material, means for moving a strip of light sensitive material adjacent each of said units for registering successive portions thereof with said units for exposure to light, each of said units including a light, and means interposed between its subjective and the light sensitive material for diffusing and controlling the projection of light onto said material, and means in each of said units for blocking out complementary areas of successive portions of the light sensitive material whereby different areas on different portions of the light sensitive material may be simultaneously exposed to light for producing different images on said portion.

8. An apparatus for producing composite photographs comprising spaced means for producing an image of a background design and an image of a different subjective on different areas of successive portions of a strip of light sensitive material, means for moving a strip of light sensitive material adjacent each of said units for registering successive portions thereof with said units for exposure to light, each of said units including a light and means interposed between its subjective and the light sensitive material for diffusing and controlling the projection of light onto said material, and means in each of said units for blocking out complementary areas of successive portions of the light sensitive material whereby different areas on different portions of the light sensitive material may be simultaneously exposed to light for producing different images on said portion, and a cabinet for supporting and enclosing said apparatus.

OLIVER W. AMES.